United States Patent

Compeau et al.

Patent Number: 5,251,403
Date of Patent: Oct. 12, 1993

[54] TUBULAR PLASTIC MOUNTING PANEL FOR DOOR HARDWARE

[75] Inventors: David E. Compeau, Oxford; Jayprakash U. Raisoni, Troy; Suresh D. Shah, Rochester Hills, all of Mich.

[73] Assignee: General Motors Corporation, Detroit, Mich.

[21] Appl. No.: 852,055

[22] Filed: Mar. 16, 1992

[51] Int. Cl.$^5$ ............................................. B60J 5/04
[52] U.S. Cl. .................................... 49/502; 49/348
[58] Field of Search .................... 49/352, 348, 502; 296/146 R, 146 C

[56] References Cited

U.S. PATENT DOCUMENTS

| | | | |
|---|---|---|---|
| 2,650,857 | 9/1953 | Watter et al. | 49/502 |
| 3,782,036 | 1/1974 | Clark et al. | 49/502 |
| 4,428,157 | 1/1984 | Engelsberger et al. | 49/502 |
| 4,648,208 | 3/1987 | Baldamus et al. | 49/502 |
| 4,702,040 | 10/1987 | Hellriegel | 49/502 |
| 4,769,951 | 9/1988 | Kaaden | 49/502 |
| 4,785,585 | 11/1988 | Grier et al. | 49/502 |
| 4,831,710 | 5/1989 | Katoh et al. | 49/502 |
| 4,876,825 | 10/1989 | Widrig et al. | 49/502 |
| 4,882,842 | 11/1989 | Basson et al. | 29/857 |
| 4,924,630 | 5/1990 | Lomasney et al. | 49/502 |
| 4,937,977 | 7/1990 | Gergoe et al. | 49/352 |
| 4,974,365 | 12/1990 | Ono | 49/502 |
| 5,033,236 | 7/1991 | Szerdahelyi et al. | 49/502 |
| 5,040,334 | 8/1991 | Dossin et al. | 49/502 |
| 5,040,335 | 8/1991 | Grimes | 49/502 |
| 5,067,281 | 11/1991 | Dupuy | 49/502 |
| 5,111,620 | 5/1992 | Lau et al. | 49/502 |

Primary Examiner—Peter M. Cuomo
Assistant Examiner—Michael J. Milano
Attorney, Agent, or Firm—Charles E. Leahy

[57] ABSTRACT

A mounting panel is provided for mounting a window and a window regulator in a vehicle door. The mounting panel is comprised of a one-piece plastic molded member having a central planar mounting member adapted to mount the window regulator, and a plurality of spaced apart spokes molded integrally with the center drill plate and radiating generally forward and rearward therefrom to mount the guide channel receiving the edges of the window. The window guide channels are preferably integrally molded with the radiating spokes. The spokes are hollow tubular members of generally circular cross-section. The molded plastic mounting panel also has a plurality of integrally molded arm rest supports which project laterally therefrom and are adapted to support an arm rest structure of the vehicle door. The plurality of apertured mounting brackets are molded integral with the spokes for receiving fasteners by which the mounting panel is mounted on the vehicle door. The plurality of snap fasteners are integrally molded with the mounting panel for snap together fastening of such door operating hardware as the window regulator, the window regulator motor, door handle, and the door latch control rods.

5 Claims, 4 Drawing Sheets

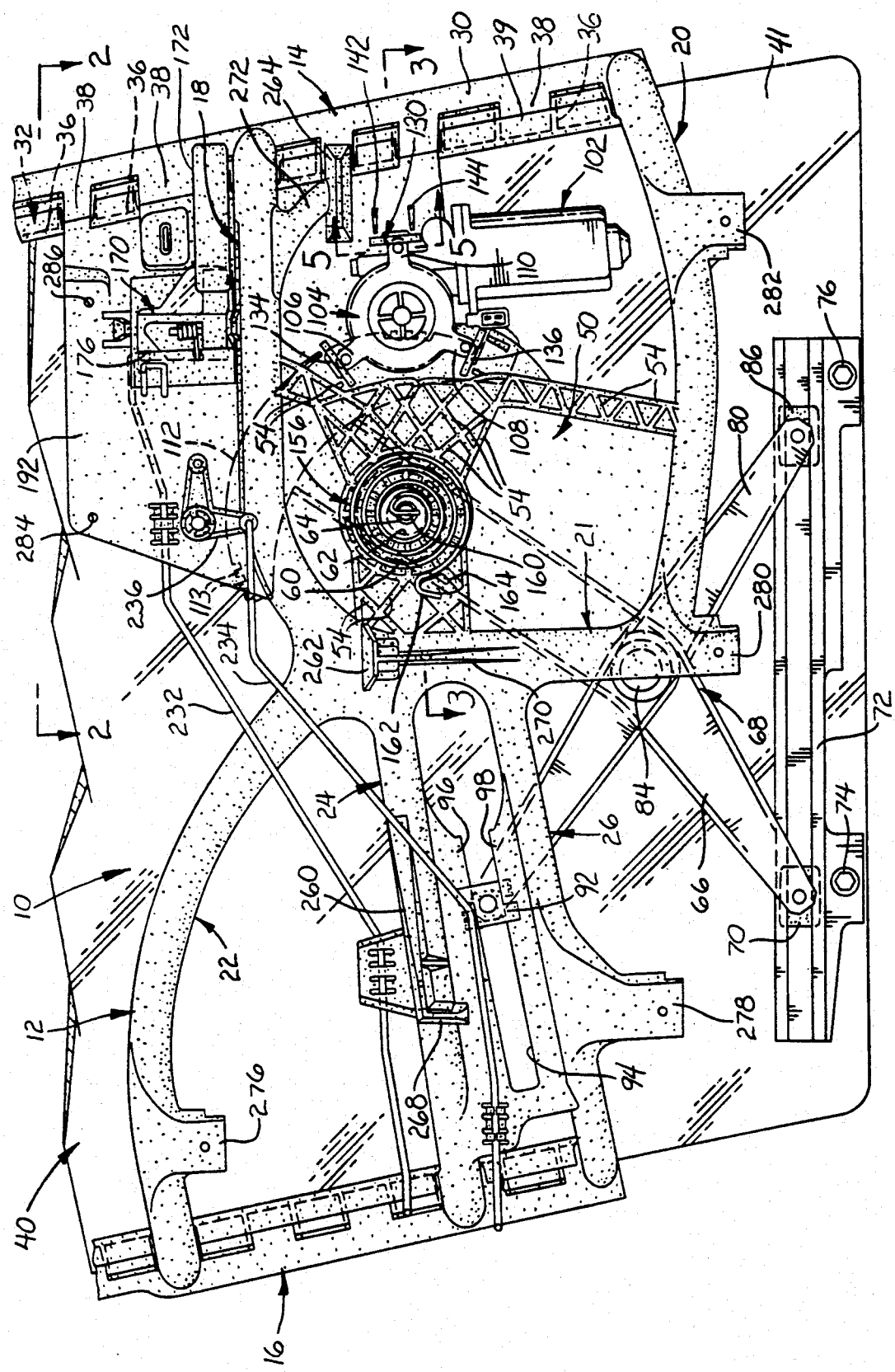

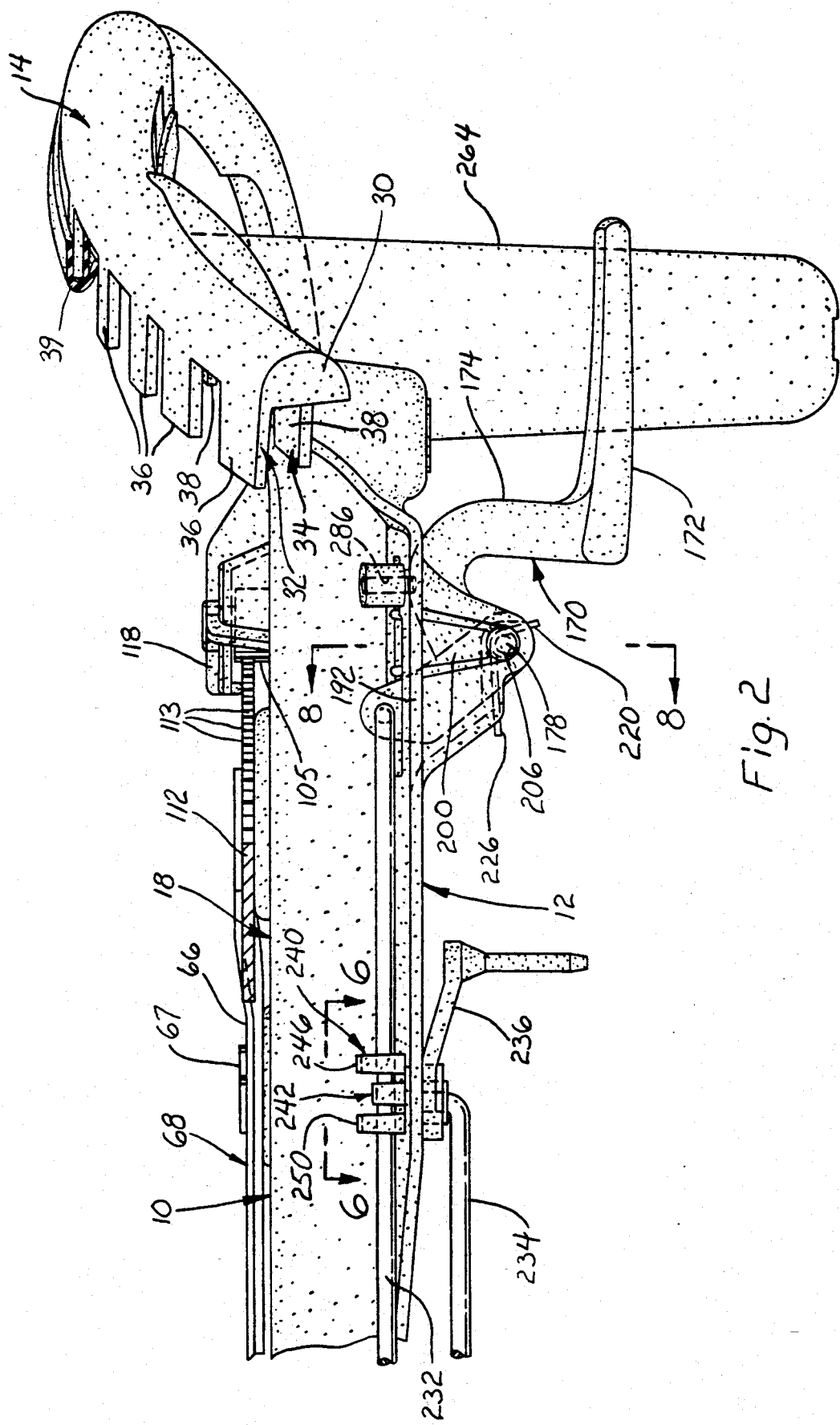

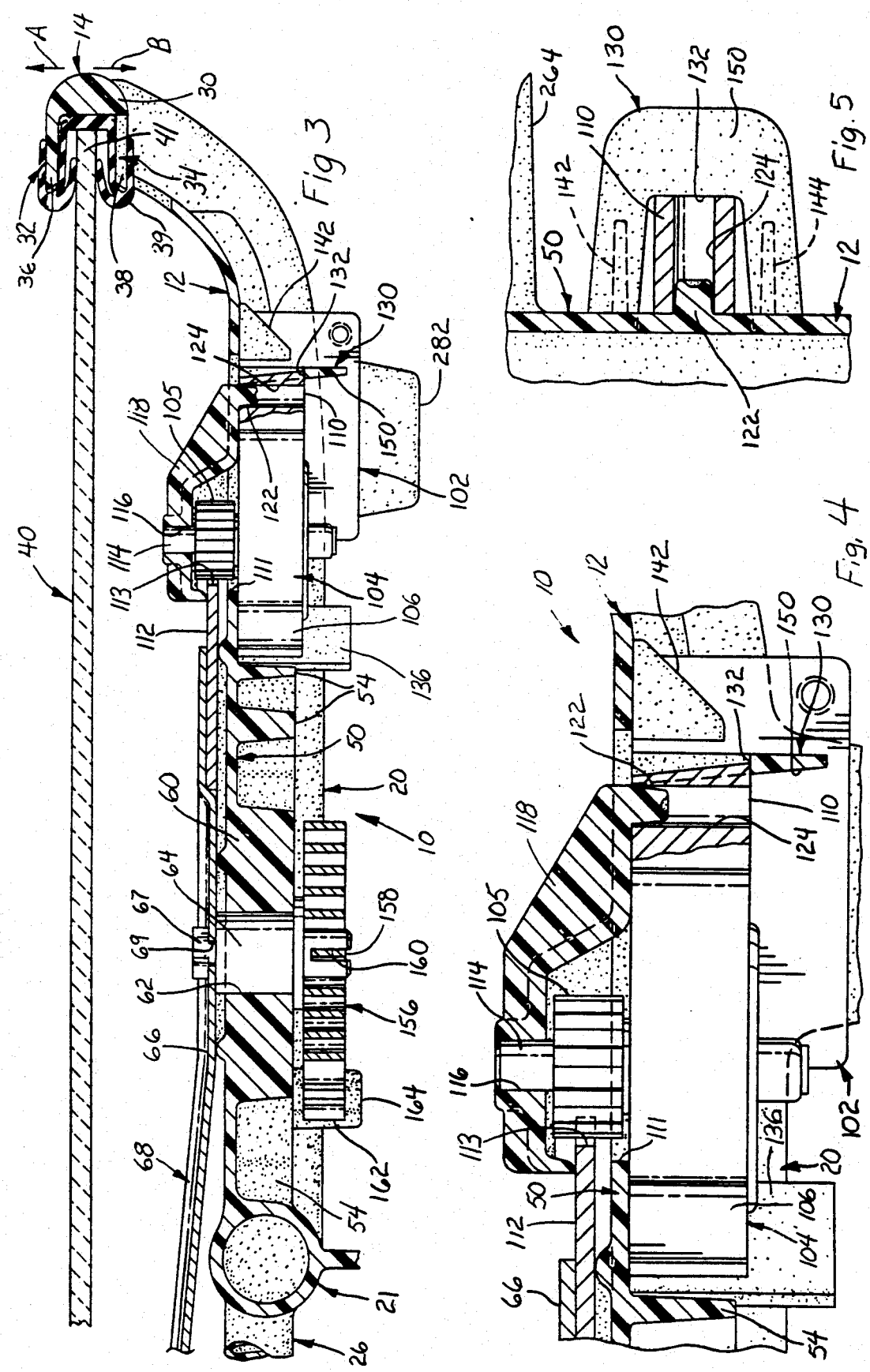

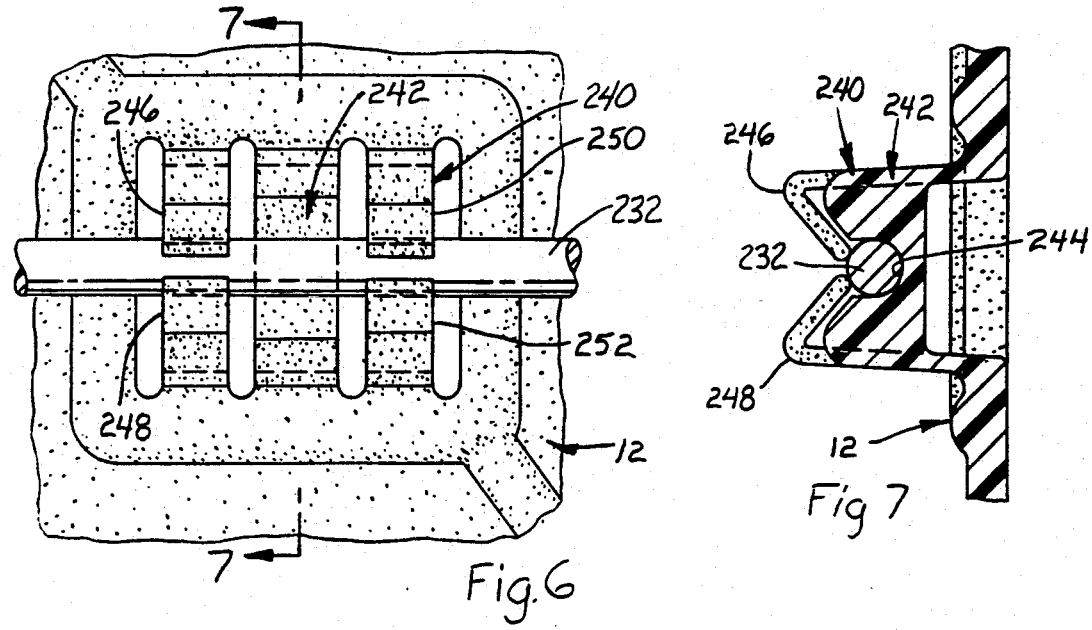
Fig. 6
Fig. 7
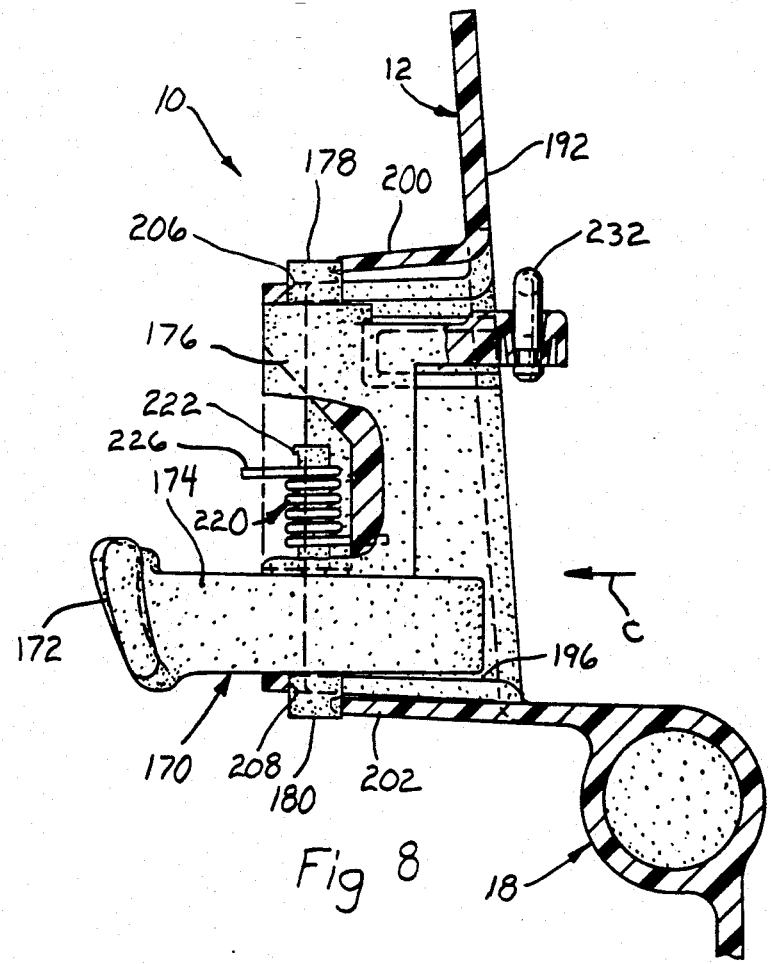
Fig 8

TUBULAR PLASTIC MOUNTING PANEL FOR DOOR HARDWARE

The invention relates to a mounting panel for moving a window, a window regulator, and a door handle in a motor vehicle door, and more particularly provides a one-piece molded plastic mounting panel comprised of a plurality of spaced apart tubular spokes extending between spaced apart window guide channels.

BACKGROUND OF THE INVENTION

The prior art has recognized the desirability of manufacturing a vehicle door with the door hardware such as the window, the window regulator, and the door handles mounted on a panel to define a module which may be preassembled and tested away from the vehicle assembly line.

The prior art has also recognized the desirability of manufacturing such a door hardware module using a molded plastic construction for the module panel in order to provide lightweight and economical manufacture. In order to provide a plastic mounting panel of adequate strength and rigidity, the prior art has recognized embedding metal tubes in the plastic module. The prior art has also recognized that the door module panel may be strengthened and stiffened by molding stiffening ribs in the plastic module panel. In addition, the prior art has recognized that the window guide channel which guides the vertical movement of the glass may be molded integrally with the window panel.

The present invention provides a new and improved molded plastic panel for a vehicle door window and hardware module.

SUMMARY OF THE INVENTION

According to the invention, a mounting panel is provided for mounting a window and a window regulator in a vehicle door. The mounting panel is comprised of a one-piece plastic molded member having a central planar mounting plate adapted to mount the window regulator, and a plurality of spaced apart spokes molded integrally with the center drill plate and radiating generally forward and rearward therefrom to mount the guide channel receiving the edges of the window. The window guide channels are preferably integrally molded with the radiating spokes. The spokes are hollow tubular members of generally circular cross-section. The molded plastic mounting panel also has a plurality of integrally molded arm rest supports which project laterally therefrom and are adapted to support an arm rest structure of the vehicle door. A plurality of apertured mounting brackets are molded integral with the spokes for receiving fasteners by which the mounting panel is mounted on the vehicle door. A plurality of snap fasteners are integrally molded with the mounting panel for snap together fastening of such door operating hardware as the window regulator, window regulator motor, door handle, and the door latch control rods.

The object feature and advantage of the invention resides in the provision of a one-piece molded plastic door module mounting panel comprised of integrally molded together tubular spokes extending between front and rear window guide channels and mounting an integral plastic mounting plate for the window regulator.

A further object, feature and advantage of the invention resides in the provision of a one-piece molded plastic mounting panel comprised of radially spaced apart spokes and having integrally molded arm rest supports projecting laterally therefrom.

A still further object, feature and advantage resides in the provision of a one-piece molded plastic mounting panel comprised of radially spaced part hollow tubular spokes and having support portions molded thereto to mount the door operating hardware such as window regulator, door handle, and arm rest.

A still further feature of the advantage resides in the provision of a one-piece molded plastic mounting panel of hollow plastic tubular construction carrying integral apertured mounting brackets for receiving fasteners by which the mounting panel is mounted on a vehicle door.

BRIEF DESCRIPTION OF THE DRAWINGS

These and other features, objects and advantages of the invention will become apparent upon consideration of the description of the preferred embodiment and the appended drawings in which:

FIG. 1 is a side elevation view of a door hardware module having the one-piece molded plastic mounting panel of this invention;

FIG. 2 is a partial plan view taken in the direction of arrows 2—2 of FIG. 1;

FIG. 3 is a section view taken in the direction of arrows 3—3 to show the mounting of a window regulator and a window regulator motor on the mounting panel;

FIG. 4 is an enlarged fragmentary view of FIG. 3;

FIG. 5 is a section view taken in the direction of arrows 5—5 of FIG. 1;

FIG. 6 is a section view taken in the direction of arrows 6—6 of FIG. 2 and showing the mounting of door latch control rods in an integral snap fastener of the door panel;

FIG. 7 is a section view taken in the direction of arrows 7—7;

FIG. 8 is a section view taken in the direction of arrows 8—8 of FIG. 2 showing snap together attachment of the inside door handle to the mounting panel.

DESCRIPTION OF THE PREFERRED EMBODIMENT

FIG. 1 is a side elevation view of a hardware module, generally indicated at 10, for a vehicle door. The module 10 is comprised of various door hardware elements mounted on a one-piece molded plastic mounting panel, generally indicated at 12. The mounting panel 12 includes a front guide channel 14, and a rear guide channel 16 which are integrally connected by a plurality of hollow tubular spokes, including spokes 18 and 20 which radiate forwardly from a central vertical spoke 21 to the front guide channel 14, and a plurality of spokes 22, 24, and 26 which radiate rearwardly from the central vertical spoke 21.

Suitable molding process and equipment for molding the hollow tubular spokes is described in U.S. Pat. Nos. 4,740,150, 4,923,667, 4,824,732, 4,923,666 and 4,498,860 owned by Cinpres Limited, Appollo House, Lichfield Road Industrial Estate, Tamworthy, Staffondshire B79 7TA, England.

The window guide channel 14 is generally C-shaped in cross section as viewed in FIG. 3 and includes a hemispherical base wall 30 and spaced apart channel walls 32 and 34. As best seen in FIGS. 1 and 2, the channel wall 32 is defined by vertical spaced apart tabs 36 and the channel wall 34 is defined by vertically spaced apart tabs 38. These tabs 36 and 38 are vertically staggered from one another so that the mold halves in which the mounting panel 12 is molded can be pulled apart in the direction indicated by arrows A and B in FIG. 3. As seen in FIG. 3, an elastomeric slide strip 39 is installed into the guide channel 14 between the channel walls 32 and 34 to slidably receive the edge 41 of a window panel 40.

As best seen in FIGS. 1 and 3, the mounting panel 12 includes a generally planar window regulator mounting plate 50 which is an integrally molded part of the mounting panel 12 and spans between the vertical spoke 21, the upper spoke 18 and the lower spoke 20. The mounting plate 50 is reinforced by a network of stiffening ribs 54 which project laterally from the mounting plate 50 and extend between the spokes 18, 20, and 21. The network of strengthening ribs 54 also defines a circular hub 60 having a bore 62 in which a metal pivot shaft 64 is rotatable. As seen in FIGS. 1 and 3, the pivot shaft 64 is non-rotatably attached to a stamped steel window regulator lift arm 66 of a window regulator generally indicated at 68. This attachment is obtained by a twist-lock projection 67 of the pivot shaft 64 which extends into an aperture 69 of lift arm 66 as described further in U.S. Pat. No. 5,079,871.

As shown in FIG. 1, the lift arm 66 carries a slide 70 on the end thereof which rides in a sash channel 72 attached to the window panel 40 by rivets 74 and 76. The window regulator 68 also includes a regulator arm 80 which is pivotally connected to the lift arm 66 by a pivot 84. The regulator arm 80 has a slide 86 carried thereon which rides in the sash channel 72. The regulator arm 80 also has a slide 92 pivotally carried on the other end thereof which rides in a slot 94 of the mounting panel 12. This slot 94 is defined by integral webs of material 96 and 98 which respectively project from the tubular spokes 24 and 26.

The mounting panel 12 also has integral features which enable the mounting of a motor assembly 102 for operating the window regulator 68. As seen in FIG. 1, the motor assembly 102 includes a gear box 104 having mounting lugs 106, 108 and 110 spaced around the circumference thereof. As seen in FIG. 3, the motor assembly 102 is positioned with the gear box 104 juxtaposed with the face of mounting plate 50 and a pinion gear 105 of the gear box 104 extending through an aperture 111 in the mounting plate 50 to engage with a plurality of teeth 113 displayed on an arcuate sector 112 carried by the lift arm 66. The pinion gear 105 is mounted on shaft 114 which projects through a bore 116 provided in a mounting arm 118 which is molded integral with the mounting plate 50. The motor assembly 102 is anchored against rotation by a cylindrical stud 122 which projects from the central plate 50 into a bore 124 in the mounting lug 110 of the gear box 104. Similar mounting studs, not shown, project through similar bores provided in the mounting lugs 106 and 108 of the gear box 104. The motor assembly 102 is fastened against removal from the mounting panel 12 by a resilient snap tab 130 which projects laterally from the mounting plate 50 and has a undercut shoulder 132 for engagement with the mounting lug 110 of the gear box 104. As seen in FIG. 1, additional snap tabs 134 and 136 are associated with the mounting lugs 106 and 108. A pair of back up shoulders 142 and 144 are molded integrally with the mounting plate 50 and project in spaced relation behind the tab 130 to prevent over travel of the tab 130. Similar back up shoulders are provided behind the snap tabs 134 and 136.

As best seen in FIG. 4, it will be understood that the motor assembly 102 is installed upon the mounting panel 12 by thrusting the gear box 104 in the direction toward the mounting plate 50 so that the mounting lug 110 engages against a ramp face 150 of snap tab 130 and urges the snap tab 130 radially outward. When the gear housing 104 reaches the position of FIGS. 3, 4 and 5 engaging the plate 50, the snap tab 130 returns to its position of FIG. 4 in which the undercut shoulder 132 engages over the face of the mounting lug 110 of gear box 104. It will be appreciated that the snap tabs 130, 134, and 136 are all similarly constructed and function to effectively attach the motor assembly 102 onto the mounting panel 14.

As best seen in FIGS. 1 and 3, a counterbalance spring 156 acts between the pivot shaft 64 and the mounting panel 12 to balance the weight or the window panel 40. The counterbalance spring 156 is a spiral spring and includes an inner end 158 anchored in a slot 160 of the pivot shaft 64 and an outer end 162 which hooks over an abutment 164 molded integrally on the mounting panel 12.

As best seen in FIGS. 1, 2, and 8, a door handle 170 is also mounted on the mounting panel 12. The handle 170 includes a hand grip 172 carried on a goose neck 174 which is integral with a shaft 176. The shaft 176 has pintles 178 and 180 projecting from the ends thereof. The mounting panel 12 has an integral mounting plate 192 molded therewith and having an opening 196 through which the handle 170 may be inserted in the direction indicated by arrow C. During such insertion of the handle 170, the pintles 178 and 180 engage against and forcibly deflect lock tabs 200 and 202 into a spaced apart position until the pintles 178 and 180 are carried into engagement with journal defining walls 206 and 208 which are molded integral with the mounting panel 12. The pintle 178 reaches the installed position shown in FIGS. 2 and 8 in which the pintle is captured between the journal defining wall 206 and the spring tab 200. The pintle 180 is similarly captured between the journal wall 208 and the spring tab 202. The handle 170 is normally biased to the rotary position shown in FIGS. 2 and 8 by a coil spring 220 seated on a spring seat 222 of the handle 170 and having a spring end 226 engaging with the mounting panel 12 to urge the handle 170 to the normal position.

The door handle 170 is connected to a door latch, not shown, by a control rod 232. Another control rod 234 is connected to a door lock handle 236 pivoted on the mounting plate 12 and also extends to the door latch.

FIGS. 6 and 7 show a rod guide, generally indicated at 240, for slidably mounting the control rod 232. The rod guide 240 is molded integrally with the mounting panel 12 and includes a cradle 242 having a recess 244 which receives the control rod 232. As best seen in FIG. 6, a first pair of flex arms 246 and 248 are positioned on one side of the cradle 242 and a second pair of flex arms 250 and 252 are positioned on the other side of the cradle 242. As best seen in FIG. 7, the first pair of flex arms 246 and 248 reach overtop of the recess 244 and are bent inwardly so that the rod 242 may be thrust into the recess by deflecting the flex arms 246 and 248 outwardly, then the flex arms restore themselves to the position of FIGS. 6 and 7 in which the flex arms will block the rod against removal. The flex arms 250 and 252 are similar in construction and operation. A suitable alternative structure for the rod guide 240 is shown in U.S. Pat. No. 5,074,676.

The molded panel 12 also includes integrally molded armrest supports 260, 262 and 264. The armrest support 260 is molded integral with the center spoke 24 and reaches several inches inboard therefrom. An integral flange 268 depends downwardly from the underside from the support 260 to stiffen the support 262 against flexure when the armrest is suitably mounted to the armrest support 260 and bears occupant weight pushing downwardly. Likewise, the armrest support 262 is supported from beneath by a gusset 270. The armrest support 264 is stiffened and strengthened by a stub spoke 272 which projects down from the upper spoke 18 and is integrally molded with the armrest support 264.

As best seen in FIG. 1, the mounting panel 12 has a plurality of integral mounting brackets, including bracket 276 integral with spoke 22, bracket 278 integral with spoke 26, bracket 280 integral with vertical spoke 21, bracket 282 integral with spoke 20. Each of these brackets has a aperture therein through which a screw or other suitable fastener may be installed to attach to the door hardware module of FIG. 1 to the vehicle door structure. In addition, a pair of mounting apertures 284 and 286 are provided in the handle mounting plate for receiving additional fastening screws.

Thus it is seen that the invention provides a new and improved door hardware module including a one piece molded plastic panel comprised of a plurality of spaced apart tubular spokes extending between spaced apart window guide channels.

It will be understood that the person of ordinary skill in the art may make modifications to the invention within the scope of the appended claims. For example, the window guide channels 14 and 16 need not be integrally molded with the spokes, but may be separate plastic or metal guide strips suitably attached to the ends of the spokes of the mounting panel. In addition, the central mounting plate 50 is provided as a convenient mounting location for the window regulator, however, certain motor vehicles applications may provide alternate mounting of the window regulator and thereby obviate the need for providing a mounting plate structure integral with the molded plastic mounting panel. Additionally, the various integral snap tab arrangements proposed therein are merely exemplary of the types of snap tabs arrangements which can be employed to mount door hardware such as lock rods, handles, and window regulator motors.

These and other modifications to the invention may be made within the ordinary skill of the art.

The embodiments of the invention in which an exclusive property or privilege is claimed are defined as follows:

1. A mounting panel for mounting a window and a window regulator in a vehicle door, comprising:
a one piece plastic molded member having a plurality of spaced apart hollow tubular spokes molded integrally and radiating generally forward and rearward therefrom, first and second window guide channels respectively molded integrally with the forward and rearward radiating spokes to receive the edges of the window, and a plurality of integrally molded arm rest supports projecting laterally from the molded member and adapted to support an armrest structure of the vehicle door.

2. A mounting panel for mounting a window and a window regulator in a vehicle door, comprising:
a one piece plastic molded member having a plurality of spaced apart hollow tubular spokes molded integrally and radiating generally forward and rearward therefrom, first and second window guide channels respectively molded integrally with the forward and rearward radiating spokes to receive the edges of the window, and a plurality of snap fasteners integrally molded with the mounting panel for snap together fastening of door operating hardware on the mounting panel.

3. A mounting panel for mounting a window and a window regulator in a vehicle door, comprising:
a one piece plastic molded member having a central mounting plate adapted to mount a window regulator, a plurality of spaced apart hollow tubular spokes molded integrally and radiating generally forward and rearward from the central mounting plate, first and second window guide channels respectively molded integrally with the forward and rearward radiating spokes to receive the edges of the window, a plurality of integrally molded arm rest supports projecting laterally from the molded member and adapted to support an armrest structure of the vehicle door, and a plurality of integrally molded reinforcing ribs reinforcing the central planar mounting plate.

4. A mounting panel for mounting a window and a window regulator in a vehicle door, comprising:
a one piece plastic molded member having a central mounting plate adapted to mount a window regulator, a plurality of spaced apart hollow tubular spokes molded integrally and radiating generally forward and rearward from the central plate, a plurality of snap fasteners integrally molded with the mounting panel for snap together fastening of door operating hardware on the mounting panel, and a plurality of integrally molded reinforcing ribs reinforcing the central planar mounting plate.

5. A mounting panel for mounting a window and a window regulator in a vehicle door, comprising:
a one piece plastic molded member having a central mounting plate adapted to mount a window regulator, a plurality of spaced apart hollow tubular spokes molded integrally and radiating generally forward and rearward therefrom, first and second window guide channels respectively molded integrally with the forward and rearward radiating spokes to receive the edges of the window, said guide channels being molded integral with the spokes and include spaced apart side walls defined by a plurality of tabs projecting from a base and being staggered vertically from the tabs on the other side wall.

* * * * *